United States Patent
Claus et al.

(10) Patent No.: US 11,434,997 B2
(45) Date of Patent: Sep. 6, 2022

(54) FLAT GASKETS AND THE USE THEREOF

(71) Applicant: Reinz-Dichtungs-GmbH, Neu-Ulm (DE)

(72) Inventors: Oliver Claus, Laichingen (DE); Steffen Erthle, Dornstadt (DE); Tobias Tauscher, Ulm (DE); Hans Waldvogel, Krumbach (DE)

(73) Assignee: Reinz-Dichtungs-GmbH, Neu Ulm (DE)

( * ) Notice: Subject to any disclaimer, the term of this patent is extended or adjusted under 35 U.S.C. 154(b) by 293 days.

(21) Appl. No.: 16/703,621

(22) Filed: Dec. 4, 2019

(65) Prior Publication Data
US 2020/0182355 A1 Jun. 11, 2020

(30) Foreign Application Priority Data
Dec. 5, 2018 (DE) .......................... 202018106921.7

(51) Int. Cl.
*F16J 15/08* (2006.01)
(52) U.S. Cl.
CPC ................................ *F16J 15/0818* (2013.01)
(58) Field of Classification Search
CPC .... F16J 15/0818; F16J 2015/085; F02F 11/00
See application file for complete search history.

(56) References Cited

U.S. PATENT DOCUMENTS

| | | | | |
|---|---|---|---|---|
| 5,924,700 | A * | 7/1999 | Kobayashi | F16J 15/0818 277/595 |
| 6,062,572 | A * | 5/2000 | Hasegawa | F16J 15/0818 277/592 |
| 6,948,714 | B1 * | 9/2005 | Quick | F16J 15/0818 277/592 |
| 2002/0000696 | A1 * | 1/2002 | Okazaki | F16J 15/0818 277/592 |
| 2004/0113370 | A1 * | 6/2004 | Beutter | F01N 13/1805 277/591 |
| 2005/0134007 | A1 * | 6/2005 | Kinoshita | F16J 15/0818 277/628 |
| 2009/0229106 | A1 * | 9/2009 | Nikamoto | F16J 15/0818 29/527.1 |
| 2011/0001295 | A1 * | 1/2011 | Egloff | F16J 15/0818 277/592 |
| 2018/0328490 | A1 * | 11/2018 | Claus | F16J 15/064 |

FOREIGN PATENT DOCUMENTS

| | | | | |
|---|---|---|---|---|
| DE | 202011103423 U1 | 9/2012 | | |
| DE | 102014017575 A1 | 6/2015 | | |
| JP | 2002039387 A | * | 2/2002 | .......... F16J 15/0818 |
| JP | 2004360801 A | * | 12/2004 | .......... F16J 15/0818 |
| JP | 2013231450 A | * | 11/2013 | ............. B21D 22/02 |
| JP | 2016156448 A | * | 9/2016 | .......... F16J 15/0881 |

\* cited by examiner

*Primary Examiner* — Eugene G Byrd
(74) *Attorney, Agent, or Firm* — McCoy Russell LLP

(57) ABSTRACT

A gasket is described herein. The gasket might be used between internal combustion engine components. The gasket might be comprised of metal. The gasket might have several layers including a sealing layer and a compression layer. The gasket includes sections having different radii of curvature. The different radii of curvature might have particular relationships to one another.

20 Claims, 10 Drawing Sheets

| Example | R1 | R2 | R3 | R4 | H1 | B | D1 | D2 | D |
|---|---|---|---|---|---|---|---|---|---|
| 1 | 3,8 | 1,35 | 0,6 | 0,4 | 1,7 | 3,9 | 0,2 | 0,5 | 0,7 |
| 2 | 3,7 | 1,7 | 1,15 | 0,6 | 2,0 | 4,3 | 0,2 | 0,5 | 0,7 |
| 3 | 3,9 | 1,9 | 0,7 | 0,35 | 1,8 | 4,0 | 0,2 | 0,4 | 0,6 |
| 4 | 3,1 | 1,1 | 0,8 | 0,4 | 1,8 | 3,5 | 0,2 | 0,6 | 0,8 |
| 5 | 4,9 | 0,75 | 0,66 | 0,45 | 2,0 | 3,6 | 0,2 | 1,2 | 1,4 |
| 6 | 3,2 | 0,58 | 0,45 | 0,4 | 1,8 | 2,6 | 0,2 | 1,2 | 1,4 |
| 7 | 3,7 | 1,7 | 1,15 | 0,55 | 2,0 | 4,3 | 0,2 | 0,5 | 0,7 |
| 8 | 3,2 | 0,58 | 0,45 | 0,4 | 1,8 | 2,7 | 0,2 | 1,2 | 1,4 |
| 9 | 4,9 | 0,75 | 0,66 | 0,45 | 2,0 | 3,5 | 0,2 | 1,2 | 1,4 |
| 10 | 3,2 | 1,7 | 0,59 | 0,29 | 1,8 | 4,0 | 0,2 | 0,4 | 0,6 |

FLAT GASKETS AND THE USE THEREOF

CROSS-REFERENCE TO RELATED APPLICATIONS

This application claims priority under 35 U.S.C. § 119 to German Utility Model Application No. 20 2018 106 921.7, filed on Dec. 5, 2018, in the German Patent and Trade Mark Office, the contents of which is incorporated herein by reference in its entirety.

TECHNICAL FIELD

The present disclosure relates to a flat gasket for sealing fluid through-openings, such as are used, for example, as part of an exhaust gasket, a turbocharger gasket or the like.

BACKGROUND AND SUMMARY

Pipes that comprise circumferential embossings and are inserted to seal hot gas-conducting flange connections can be used to seal various fluid through-openings independently of one another. However, these are very complex to produce and often exhibit precision problems. Since gaskets are often exposed to hot and corrosive fluids, such as combustion gases, over the entire lengths thereof, premium, and therefore expensive, materials have to be used for the production thereof.

In addition, annular profile gaskets with cross-sections shapes similar to the characters C, < and ϵ are inserted into grooves to seal such sealing systems. However, these gaskets are produced using very complex processes. Seamless manufacturing requires a multi-stage production process, during which the material is additionally subjected to an extensive die forming process, and consequently to stress. As an alternative, a production approach using sheet metal to be closed to form a ring is possible. The joint, however, can have inhomogeneities and result in leakage. Moreover, due to the subsequent rolling process, these C, < and ϵ cross-section rings are generally only be produced in a circular, or at the most in a substantially circular, design.

DE 20 2011 103 423 U1 discloses such a sealing system comprising a flat metal gasket between a first and a second component, which is used to seal a fluid through-opening. The first and second components sealed by way of the flat metal gasket have a design so as to completely accommodate the flat metal gasket. In particular, at least one of the components includes an annular groove which extends circumferentially around the fluid through-opening and in which the flat metal gasket is completely inserted.

In the uncompressed state, this gasket, in the region of the groove, has an ascending slope or descending slope greater than the groove depth, having a wave shape superimposed thereon, as a function of the design of the groove. The gasket is thus only inserted into the provided groove during assembly of the mating components in particular embodiments.

It is thus the object of the present disclosure to provide a flat gasket that ensures a permanent sealing action and can be produced, transported and mounted with little effort, and a sealing layer and an element, and an internal combustion engine comprising these.

This object is achieved by the gaskets according to the application.

Similar to other conventional flat metal gasket, the flat gasket according to the present disclosure comprises a first metallic sealing layer and a first metallic compression protective layer adjoining the same. It is also possible to provide several gasket layers and/or several compression protection layers. Other embodiments use exactly one compression protection layer. A further advantageous embodiment uses exactly one sealing layer for exactly one compression protection layer. The flat gasket according to the present disclosure comprises an edge. The edge may be described as an inner edge, outer edge, circumferential or a rim edge. For example, the circumferential edge of a media flow opening or an outer edge of the flat gasket. In the case of media flow openings, the two media flow openings are arranged adjoining one another in the flow direction, and consequently form a shared continuous media flow opening. In embodiments where all the layers of the flat gasket are provided with such a media flow opening, the shared media flow opening extends through the entire flat gasket.

The first sealing layer overlaps the compression protective layer in an overlapping section, but additionally protrudes beyond the edge of the compression protective layer, so that the first sealing layer, in a top view on the first sealing layer and the first compression protective layer, forms the circumferential or rim edge of the flat gasket, and the compression protective layer is retracted in relation to the circumferential edge. The region of the sealing layer in a top view between the edge of the compression protective layer and the circumferential edge of the flat gasket and of the sealing layer comprises a sealing section extending along the circumferential edge. Additional regions may extend between this sealing section and the overlapping section of the sealing layer, for example, the sealing layer, in a cross-sectional view, can extend, in this intermediate region between the overlapping section and the sealing section, from the compression protective layer in the direction of the circumferential edge, substantially or completely in the plane of the first sealing layer in the overlapping section.

At least in sections longitudinally with respect to, and at least in sections circumferentially around, this sealing section, the first metallic sealing layer and the first metallic compression protective layer thus include an overlapping section in which, in a view on the first sealing layer and the first compression protective layer, these two layers are located on top of one another and cover one another.

Proceeding from the overlapping section, pointing to the circumferential or rim edge of the flat gasket, or pointing radially to the center of a media flow opening, the sealing section of the flat gasket according to the present disclosure, which forms part of the first sealing layer, is deformed so as to extend in the direction of the plane of the compression protective layer or, alternatively thereto, in the opposite direction. In the first case, the sealing section can protrude into the media flow opening in the first compression protective layer, or can also protrude beyond the first compression protective layer, on the side thereof facing away from the first sealing layer.

In the direction of the circumferential edge, that is, for example, pointing radially to a media flow opening, the sealing section consecutively, and, in particular, immediately adjoining one another, comprises a first section, for example an outer section, a second section, for example a central section, and a third section, for example an inner section. The first section has a curvature (perpendicular to the layer plane of the first sealing layer in the region of the overlapping section) having a radius R1, wherein the curvature extends at least across a region seen radially, or also completely across the first section. The curvature might be directed in the direction of the first compression protective layer. The second section and the third section each partially or completely comprise a non-curved, straight section, in each case seen in the radial direction of the media flow opening or in a direction perpendicular to the circumferential edge. In embodiments, the inner section may comprise not just one straight section, but two straight sections which, in turn, may be connected to one another by a bending point having a radius.

Proceeding from the overlapping section, an additional section can be provided, for example a region in which, in a cross-sectional view, the first sealing layer extends in a straight manner, at least at a distance from and along the circumferential edge of the flat gasket, at least in sections between the overlapping section and the sealing section, and in particular the first section of the sealing section. The sealing section transitions asymptotically into the additional section.

The transitions between the first section and the second section, and between the second section and the third section, are designed so that the first section curved with the radius R1 and the straight section of the second section transition into one another by way of a transition point, which, in turn, is curved with a radius R2 perpendicularly to the layer plane of the first sealing layer in the region of the overlapping section. According to the present disclosure, the second section and the third section are connected to one another so that the straight section of the second section and the adjoining straight section of the third section are connected in the radial direction of the media flow opening, or in the perpendicular direction to the circumferential or rim edge, by a bending point, which is curved with a radius R3.

In embodiments of the present disclosure, $R1 \geq R2$ and $R1 > R3$ apply to the radii R1, R2, R3.

A bending point in the sense of the present disclosure is not to be understood as a point of infinitesimal small extension, but means a section of an arc, which at least on its outer side shows a measurable extension. On its inner side, it may show a measurable extension.

In other words, the curved region of the first section is curved with a larger radius than the adjoining transition or bending points between the first section and the second section or between the second section and the third section.

In embodiments of the present disclosure, the sealing section of the flat gasket extends in a self-contained manner along the circumferential edge.

According to embodiments of the present disclosure, the bending point between the second section and the third section is oriented, in the non-compressed state of the flat gasket, in such a way that the bending point has a curvature opposite the curvature having the radius R1. In other words, the first sealing layer extends through the first section in the direction of the first compression protective layer, or away therefrom, and, seen inwardly in the radial direction, then again bends in such a way that the third section extends at a relatively small or no angle with respect to the first sealing layer in the overlapping section, and in particular that the third section comprises substantially parallel sections with respect to the first sealing layer in the overlapping section, the deviation in direction being no more than 35°, wherein the inclination within the third section may change.

If the flat gasket according to the present disclosure is clamped between two mating components, the sealing section is compressed, but not completely, due to the first compression protective layer. However, the first section then rests against a mating component, and the third section rests against an opposing mating component. As a result of the transition and bending points, it is not only one curved region that plays a role in the springback during compression, but the third, second and first sections, so that overall a very high springback potential is available. The interaction between the compression protective layer and a large radius R1 in the curved first section causes the first region to roll when the distance between the mating components is increased, that is, when the components are moved. This configuration might improve stress distribution in the first section.

If embodiments of a flat gasket or sealing layer according to the present disclosure are considered in a radial direction relative to the through opening and starting at the first section and ending at the third section, then one embodiment includes a curvature with the radius R3 oriented in an opposite direction of a curvature with the radius R1. In additional embodiments, the curvatures with the radii R1 and R2 point in the same direction. Still further embodiments include curvatures with the radii R1 and R2 oriented in the same direction and the curvature with the radius R3 oriented in the opposite direction relative to the direction of radii R1 and R2.

This is also already ensured under cold start conditions, of an internal combustion engine, for example, so that cold leaks are prevented. Due to the sealing section extending around the at least one fluid through-opening, an offset between the individual layers of the flat gasket or between the mating components and the flat gasket, and the mating components among one another, does not result in decreased sealing between the mating components.

With suitable mating components, the mating components, provided they comprise a suitable layer, may themselves act, with this layer, as a compression protective layer according to the present disclosure. This allows the costs for producing the flat gasket according to the present disclosure to be further reduced still.

Due to the high springback potential of the flat gasket according to the present disclosure, or of the sealing section thereof according to the present disclosure, the flat gasket according to the present disclosure can replace multiple conventional beaded sealing layers with the first sealing layer. In this way, an offset between the sealing layers is prevented in the first place, and a potential cause for leaks is avoided from the start. Moreover, a lower bolt load is needed for clamping the flat gasket between mating components, which, consequently, also allows the mating components to slide more easily with respect to one another or with respect to the flat gasket. Lower bolt loads increase the service life of the bolts or other fastening means. Such sliding compensates for differing thermal expansions and shrinkages arising in light of uneven heating or cooling of the components sealed by way of the flat gasket according to the present disclosure.

An additional slide coating for high temperature components, such as exhaust manifolds and the like, can then be dispensed with. This also further reduces the costs for producing a flat gasket according to the present disclosure.

The radius R1 might be considerably larger than the layer thickness D1 of the first sealing layer, which is determined in straight regions extending parallel to the first compression protective layer, such as in the overlapping section. One of the following relationships of $R1 \geq 8\,D1$ might apply, $R1 \geq 10\,D1$, and $R1 \geq 12\,D1$. Embodiments with a large radius R1 relative to the layer thickness D1 causes, in particular, that scoring, in particular, of the first section, but also of the entire sealing section, in the mating components is substantially avoided. This applies, in particular, to soft mating components, made of aluminum alloys, for example.

In embodiments of the present disclosure, all radii, $R_1$, $R_2$, $R_3$ and $R_4$ of the curvatures are larger than the thickness D1 of the layer, in which they are formed, due to the function of the gasket and the sealing layer. Thus, these curvatures do not correspond to curvatures which are formed with the minimum bending radius of the sealing layer. Thus an extremely strong deformation of the sealing layer, for example close to its breaking limit is avoided, since the particular shaping of the sealing layer is not aimed on a stiffening of the sealing layer or an equilibration of length because of a sequence of beads, but rather the formation of suited sealing lines.

In embodiments of the present disclosure, with respect to the height H1 of the first sealing layer in the sealing section, which is spanned in a perpendicular direction with respect to the first compression protective layer in the non-compressed state by the sealing section of the first sealing layer, $H1 \geq 6$ $D1$ applies, and $H1 \geq 8$ $D1$. The height in this respect is determined between the outermost region, perpendicular to the layer plane of the first compression protective layer, of the surface of the first section facing away from the first compression protective layer and the outermost region, located opposite thereto and perpendicular to the layer plane of the first compression protective layer, of the surface of the third section adjoining the first compression protective layer.

In embodiments of the present disclosure, with respect to the width of the sealing section of the first sealing layer in the radial cross-section from the overlapping section to the media flow opening through the first sealing layer, usually from the inner circumferential edge of the media flow opening through the first compression protective layer to the circumferential edge of the media flow opening of the first sealing layer, $B \geq 10$ $D1$ applies, and $B \geq 14$ $D1$.

Additional values can apply to embodiments of the radii R1, R2 and R3, in particular at least one of $R1 \geq 2$ $R3$, $R1 \geq 3$ $R3$, $R1 \geq 5$ $R3$, $R2 \geq R3$, $R2 \geq 2$ $R3$, $R1 \geq 2$ $R2$, $R1 \geq 3$ $R2$, or $R1 \geq 5$ $R2$.

In additional embodiments, in a cross section in a direction pointing from the overlapping section to the circumferential or rim edge, the third section sequentially may comprise two straight partial sections, which are connected to each other via a bending point with a radius R4. It might be advantageous if R3 is between half and twice R4, thus $0.5 \leq R3/R4 \leq 2$.

In further embodiments, the curvatures with the radii R3 and R4 point in the same direction, meaning that the third section in cases can form several sealing lines. If the above mentioned values for the radii and thickness are used, then the sealing section is formed with a particularly high springback potential, which further enhances the sealing effect and further reduces the danger of a break of the first sealing layer or the danger of breaks of the bead. These embodiments further allow to reduce the bolt forces to be used.

If the above-described values are indicated, the sealing section is designed with a high springback potential which might improve sealing action, and the risk of the first sealing layer breaking or of the beads cracking might be reduced. It is then also possible to reduce the bolt loads further.

In other embodiments, values were also ascertained for the design of the thicknesses of the first sealing layer D1 and of the first compression protective layer D2, namely $D1+D2 \geq 2.5$ $D1$, more $D1+D2 \geq 4$ $D1$, and $D1+D2 \geq 5$ $D1$.

The thickness of the first compression protective layer is thus greater or considerably greater than the thickness of the first sealing layer. This provides sufficient space for the sealing section of the first sealing layer to apply the spring forces thereof so as to seal the two mating components.

According to the present disclosure, the sealing section of the first sealing layer, in the installed state, can now form one or more sealing lines, which, if necessary, also extend concentrically along the inner circumferential edge of the media flow opening of the first sealing layer and/or of the sealing section. In this way, a respective sealing line extending circumferentially, and, in particular, extending completely circumferentially, around the respective media flow opening, can be formed on different sides of the layer plane of the first compression protective layer. Sealing lines can be formed with respect to both mating components between which sealing is to be achieved.

In particular, the third section can rest against the adjoining component, if necessary, also in a planar manner or forming a single sealing line having a defined width, while the first section can rest against the adjoining component in a linear or planar manner.

The aforementioned media flow openings can, in particular, be arranged coaxially or with center lines extending parallel to one another, which may be offset from one another, if necessary. This makes it possible for the medium to flow via the media flow openings from one side of the flat gasket to the other side of the flat gasket, as is customarily the case with gaskets in the exhaust gas system or turbocharger gaskets.

The flat gasket was described above for a first sealing layer and a first compression protective layer. However, it is also possible to provide additional sealing layers, which can be designed in a manner identical to the first sealing layer. In contrast to the first sealing layer, the sealing section of one, more or all of these additional sealing layers can also be arranged so as to be deformed away from the compression protective layer, seen in the radial direction toward the media flow opening. The additional sealing layers can, in particular, extend completely parallel to the first sealing layer, in particular in the sealing section thereof, or also completely mirror-symmetrically with respect to the first sealing layer, in particular in the sealing section thereof, wherein, in particular, a plane between the overlapping sections of the mirror-symmetrically designed sealing layers, and in particular a spacer layer or also a compression protective layer, can serve as the mirror plane for the mirror symmetry.

It is also possible to provide additional compression protective layers, and, in particular, two compression protective layers, which are arranged on top of one another, instead of one compression protective layer, or also a dedicated compression protective layer for each of the sealing layers.

The present disclosure furthermore comprises a sealing layer for sealing with respect to two adjoining surfaces of two components. This sealing layer can be combined with a compression protective layer. The compression protective layer can be separate component or form part of one of the components to be sealed. At least in sections along a circumferential or rim edge of the sealing layer, and at least in sections at a distance from the circumferential edge of the sealing layer, the sealing layer comprises at least one overlapping section, in which the sealing layer and a compression protective layer can overlap. In a direction pointing away from the overlapping section to the circumferential edge, the sealing layer furthermore comprises a sealing section that is designed so as to have the following properties in a cross-section pointing from the overlapping section to the circumferential edge:

a) the sealing section is deformed out of the plane of the sealing layer in the overlapping section and, consecutively, comprises a first section, a second section and a third section;

b) the first section is partially, substantially or completely curved with a radius R1, and the second section and the third section each partially or completely comprise a non-curved, straight section; and c) the first section curved with the radius R1 and the straight section of the second section transition into one another by way of a transition point having a radius R2;

d) the straight section of the second section and the straight section of the third section transition into one another by way of a bending point having a radius R3; and e) R1≥R2 and R1>R3.

According to the present disclosure, the flat gasket according to the present disclosure can be used in an internal combustion engine, and in particular, as an exhaust gasket, a turbocharger gasket or the like.

Hereafter, examples of flat gaskets according to the present disclosure and of the applications thereof are provided. Identical or similar reference numerals are used for similar elements in the figures, so that these will not be mentioned again separately in the following figures.

The figures illustrate examples comprising a multitude of optional refinements. The individual refinements form features that can be used, either alone or in any combination with features from the same example or features from other examples, to refine the present disclosure.

DETAILED DESCRIPTION

Figures 1, 2:
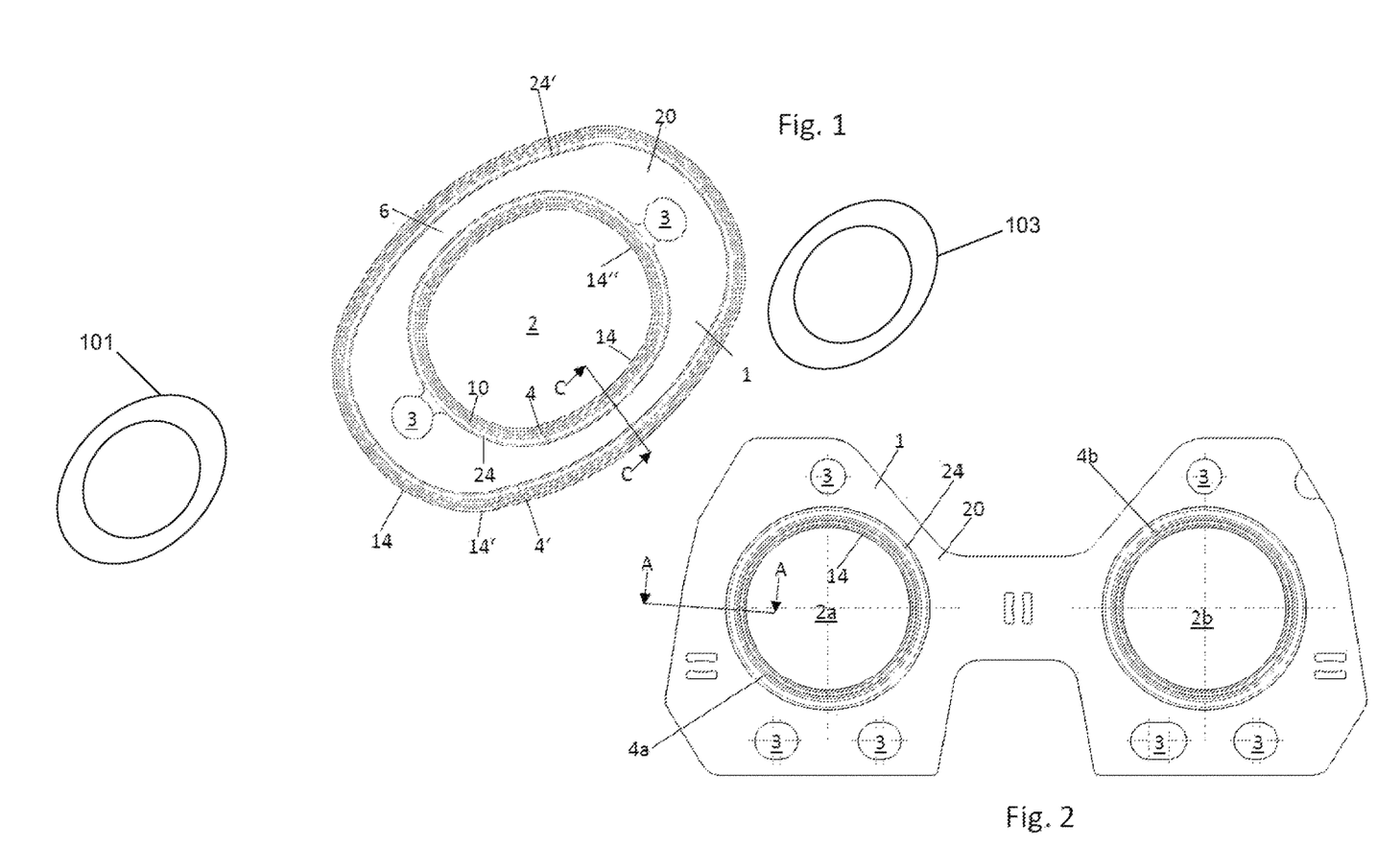
FIGS. 1 and 2 show two examples of exhaust gaskets according to the present disclosure.

FIG. 1 shows an exhaust gasket 1 comprising a first metallic sealing layer 10. The metallic sealing layer 10 includes a media flow opening 2, here for hot combustion exhaust gases of an internal combustion engine. The exhaust gasket 1 might be positioned between two mating surfaces of engine components 101 and 103, such as an exhaust manifold, cylinder head, or turbocharger. The sealing layer 10, shown in a top view in FIG. 1, furthermore includes two bolt holes 3 for fixing the flat gasket 1 between two mating components.

In this top view, an embodiment of the sealing layer 10 is apparent with the sealing elements thereof, both in the sealing section 4 surrounding the media flow opening 2 adjacent to the inner edge 14'' thereof, and in the sealing section 4' on the outer edge 14' of the sealing layer 10. In the direction of the observer, a first compression protective layer 20, which in this top view, however, extends neither into the sealing section 4 nor into the sealing section 4' on the outer edge of the sealing layer 10, as follows from the position of the circumferential or rim edges 24, 24' and consequently only superimposes the sealing layer 10 outside the sealing sections 4, 4', that is between the sealing sections 4, 4', in an overlapping section 6, is located above the sealing layer 10.

FIG. 2 shows another exhaust gasket including two media flow openings 2a, 2b, which are otherwise designed in a manner similar to the exhaust gasket of FIG. 1 with respect to the sealing around the media flow openings 2a, 2b. In the embodiment, cross-section C-C of the exhaust gasket of FIG. 1 and the cross-section A-A of the exhaust gasket of FIG. 2 comprise identically designed sealing sections 4 or 4a and 4b.

Figure 3A:
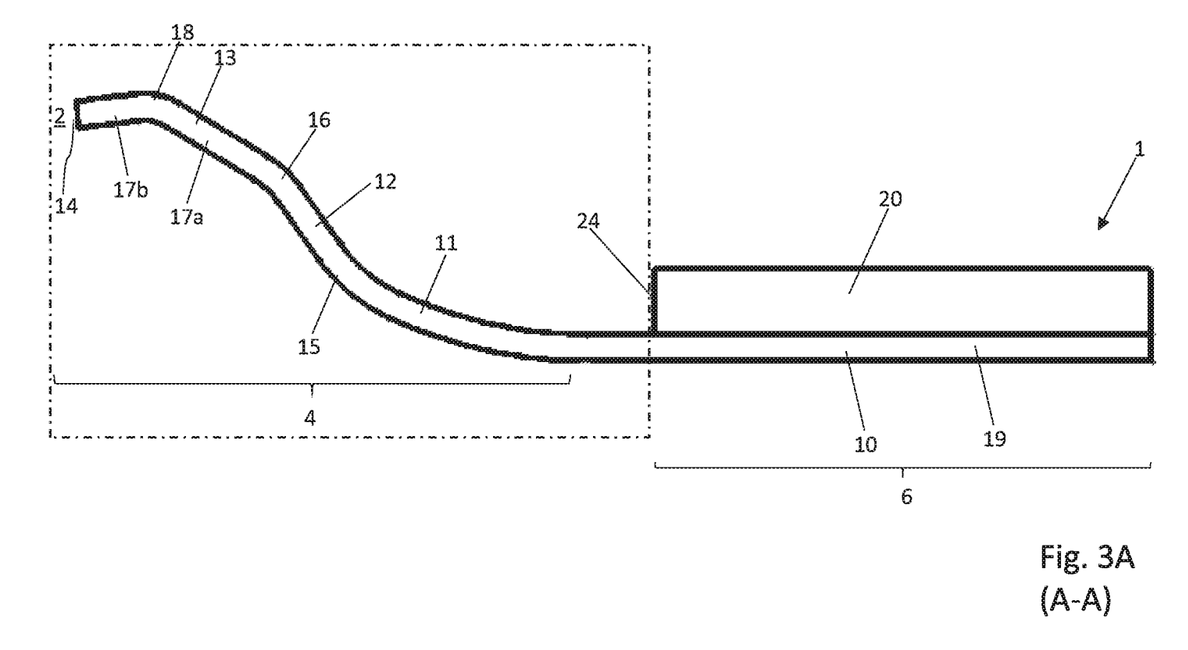
FIGS. 3A and 3B show a flat gasket according to the present disclosure in different cross-sections and in a detail view.

FIG. 3A shows a radial cross-sectional view in the region of flat gasket shown in FIG. 2 extending circumferentially around the media flow openings along the line A-A, the lower case letters a denoting the elements on the media flow opening 2a being dispensed with here, in a more generalized manner. The terms outer, central and inner sections herein refer to sections of an inner edge.

The first sealing layer 10 and the first compression protective layer 20 are located directly on top of one another, and overlap one another, in the overlapping section 6. The overlapping section 6 consequently extends radially outwardly from the circumferential edge 24 of the media flow opening in the first compression protective layer 20. A sealing element in a sealing section 4, which is designed according to the present disclosure, adjoins the region of the overlapping section 19 for the first sealing layer 10, corresponding to the overlapping section 6. In the radial direction with respect to the media flow opening 1 inwardly toward the media flow opening 2, the sealing element of the sealing section 4 comprises an outer first section 11, a central second section 12, and an inner third section 13. In the present example, the inner section 13 ends in a radially inward direction with the circumferential edge of the media flow opening 2 in the first sealing layer 10, that is with the circumferential edge of the flat gasket.

The transition from the outer section 11 to the central section 12 takes place by way of a curved transition point 15, and the transition from the central section 12 to the inner section 13 takes place by way of a curved bending point 16.

According to embodiments of the present disclosure, the outer section has a curvature having a radius R1. The curvatures of the transition and bending points 15 and 16 have considerably smaller radii R2 and R3. The central section 12 and the outer section 13 each comprise at least one straight section. In the present example, the inner section 13 comprises not just one straight section, but two straight sections 17a and 17b, which, in turn, are connected to one another by a bending point 18 having a radius R4.

Figure 3B:
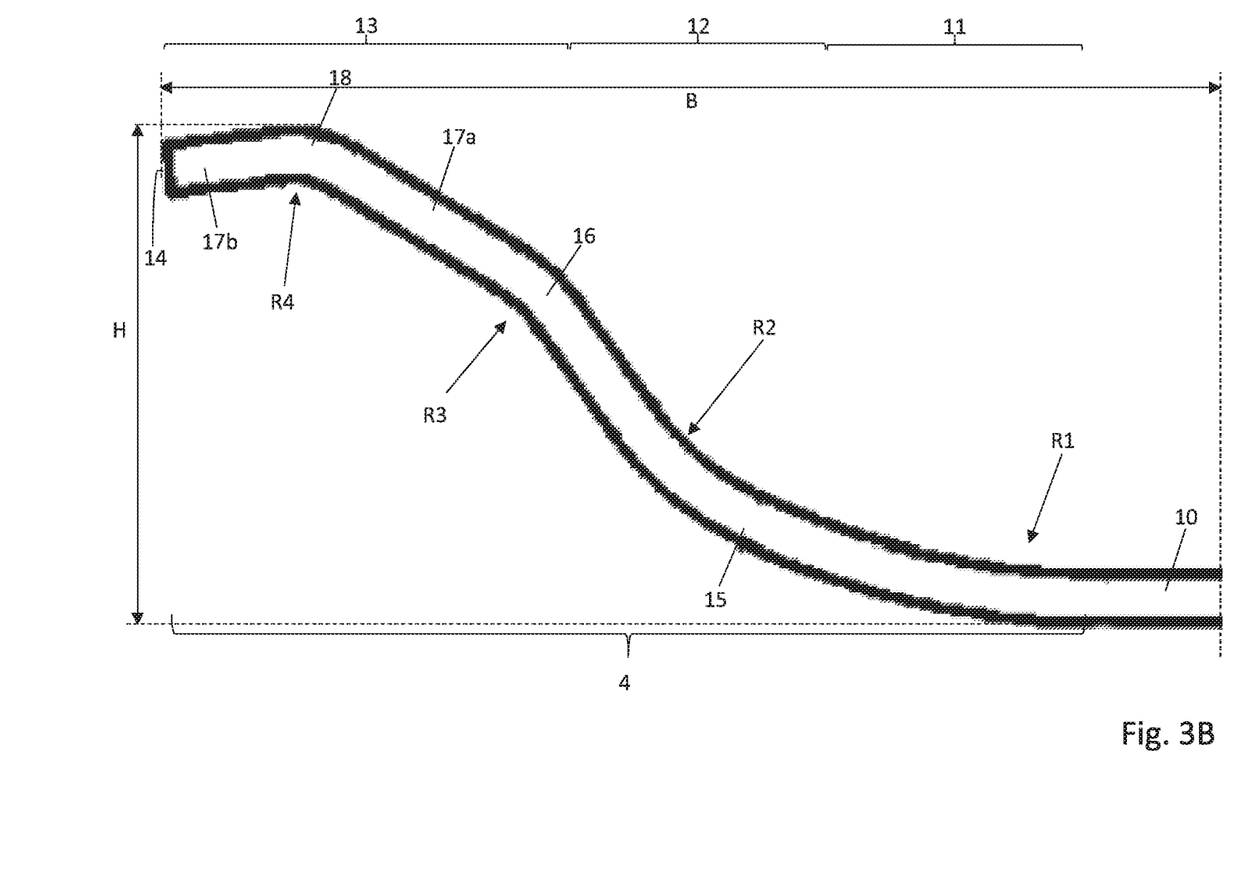

The geometry of the sealing section 4 is shown in enlarged form in FIG. 3B.

Figure 4:
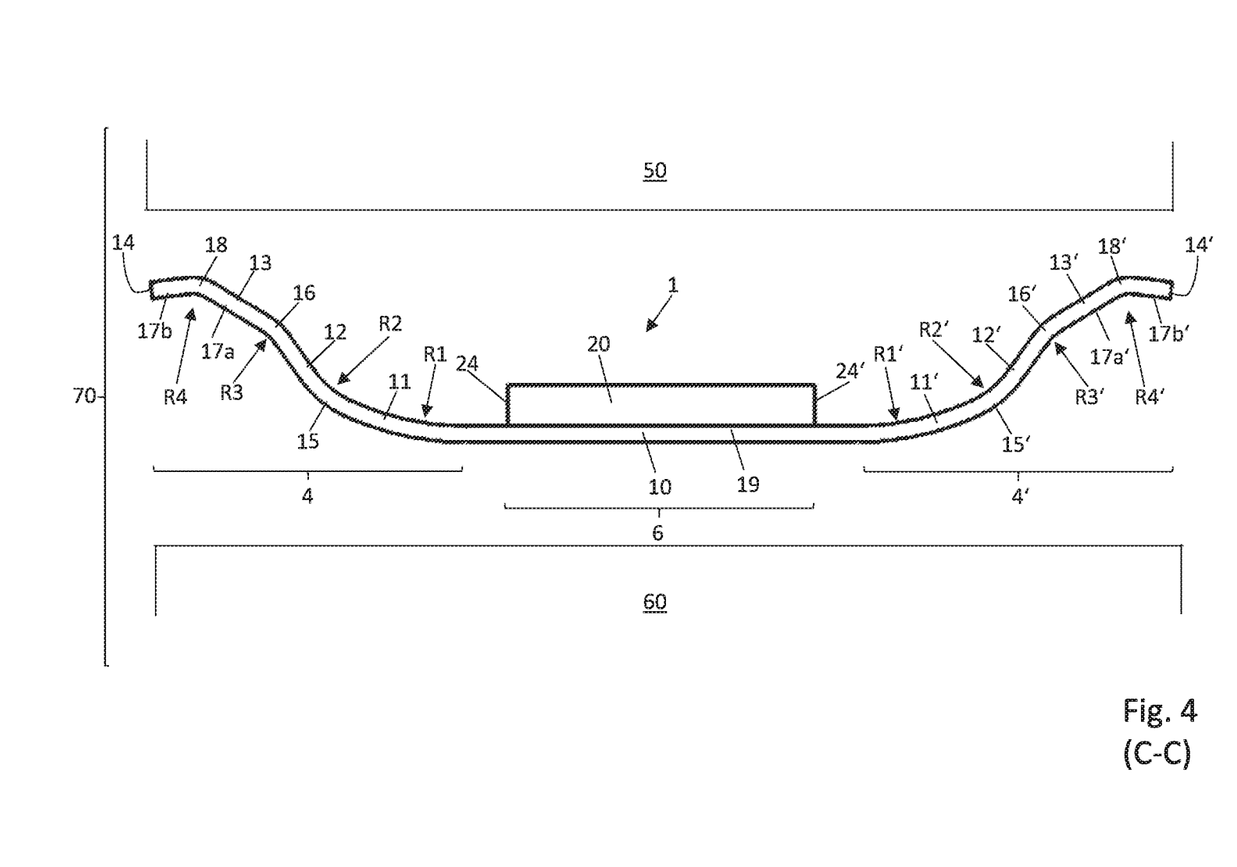
FIGS. 4 to 9 show further examples of flat gaskets according to the present disclosure.

FIG. 4 shows the cross-section along line C-C from FIG. 1. This gasket comprises a first sealing layer 10 and a compression protective layer 20, which overlap one another in an overlapping section 6. A respective circumferential edge 24, 24' of the flat gasket is present on each side of the overlapping section 6, which in the shown example is the circumferential edge of a media flow opening on the one hand, and an outer edge of the flat gasket on the other hand. The first sealing layer 10 now protrudes beyond the compression protective layer 20 on both sides, forming a respective sealing section 4 and 4'. Each of the two sealing sections 4, 4' is designed in the same manner as the sealing section 4 shown in FIG. 3A. Both sealing sections 4, 4' are formed in the same direction, so that these, in the non-assembled state, protrude over the surface of the side of the compression protective layer 20 located opposite the sealing layer 10, for example pass through the respective flow opening of the compression protective layer 20.

FIG. 4 furthermore shows the two abutting components 50 and 60, for example a cylinder head 50 and an exhaust manifold 60, and thus represent an element 70 comprising the flat gasket 1 and abutting components 50 and 60.

The remaining exemplary embodiments show a single sealing section 4, which surrounds a media flow opening 2. However, similarly to FIG. 4, it is also possible in the case of these embodiments that a respective sealing section 4, 4' is provided both on the edge 14 and on the outer edge 14', wherein the two sealing sections 4, 4' can be designed mirror-symmetrically with respect to one another on the two sides of an overlapping section 6, or can also differ from one another, having differing geometries, for example in terms of the width of the sealing section 4, 4' of the first, inner section 13, 13', of the second, central section 12, 12', and of the third, outer section 11, 11'. It is also possible for the radii R1, R2, R3, R4 of such a sealing section 4 to be identical to the radii R1', R2', R3', R4' of an additional sealing section 4', or these may be different therefrom individually or collectively. Likewise, the heights H1 and H1' of the sealing sections 4, 4' can be identical or different.

Figure 5:
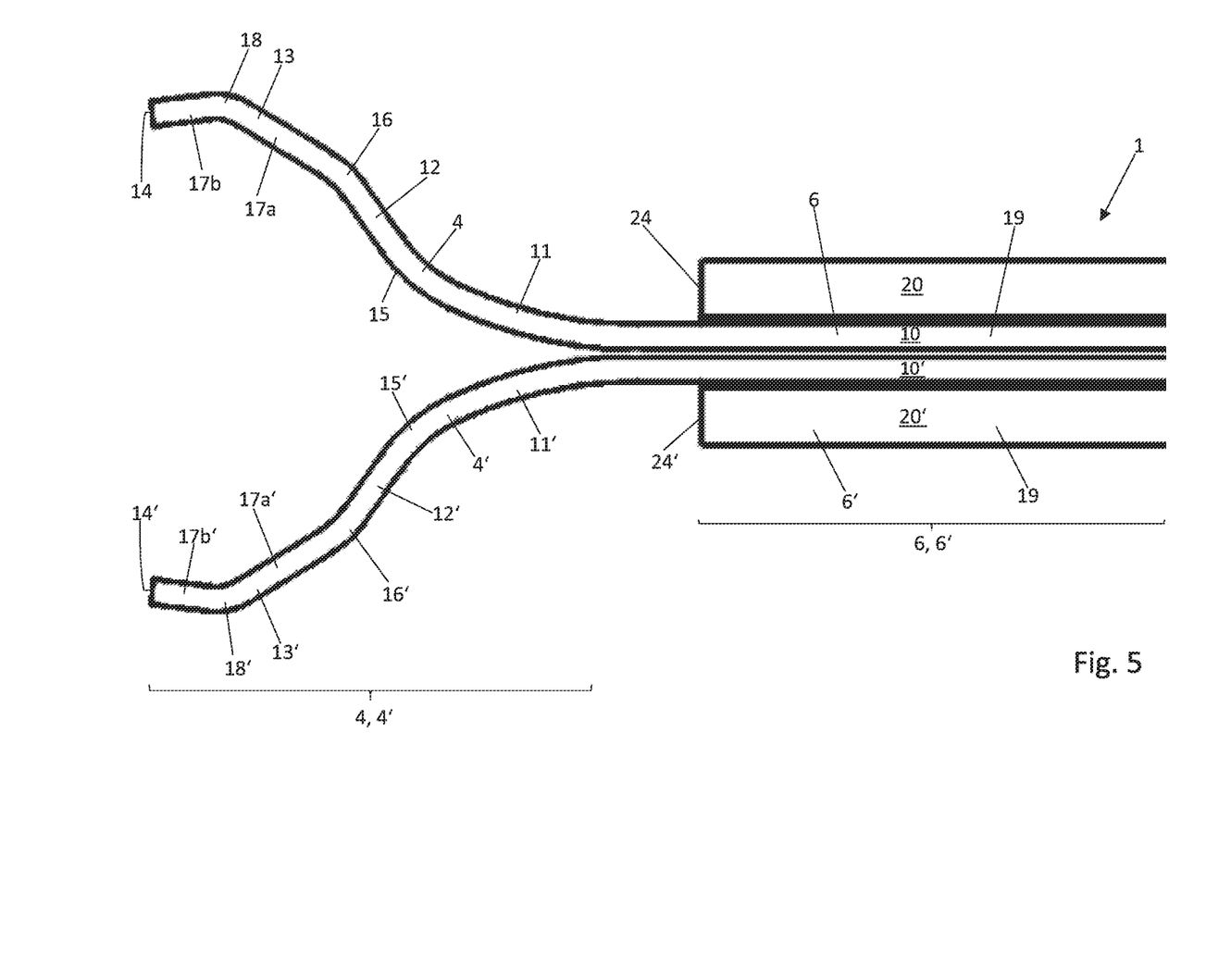

FIG. 5 shows a further embodiment of a flat gasket according to the present disclosure. This comprises a first sealing layer 10 and a first compression protective layer 20, which are designed similarly as those in FIGS. 3A and 3B.

In the embodiment, a second sealing layer 10' and a second compression protective layer 20' are arranged mirror-symmetrically thereto. In terms of design and arrangement, the second sealing layer 10' and the second compression protective layer 20' are entirely mirror-symmetrical with respect to a plane extending between the first sealing layer 10 and the second sealing layer 10'. The corresponding reference numerals are used equivalently here, but are used with primes to distinguish them from the reference numerals of the first sealing layer 10' and of the first compression protective layer 20'.

A flat gasket 1 according to FIG. 5 can improve the sealing between two mating components, which are arranged above and beneath the two compression protective layers 20, 20'.

Figure 6:
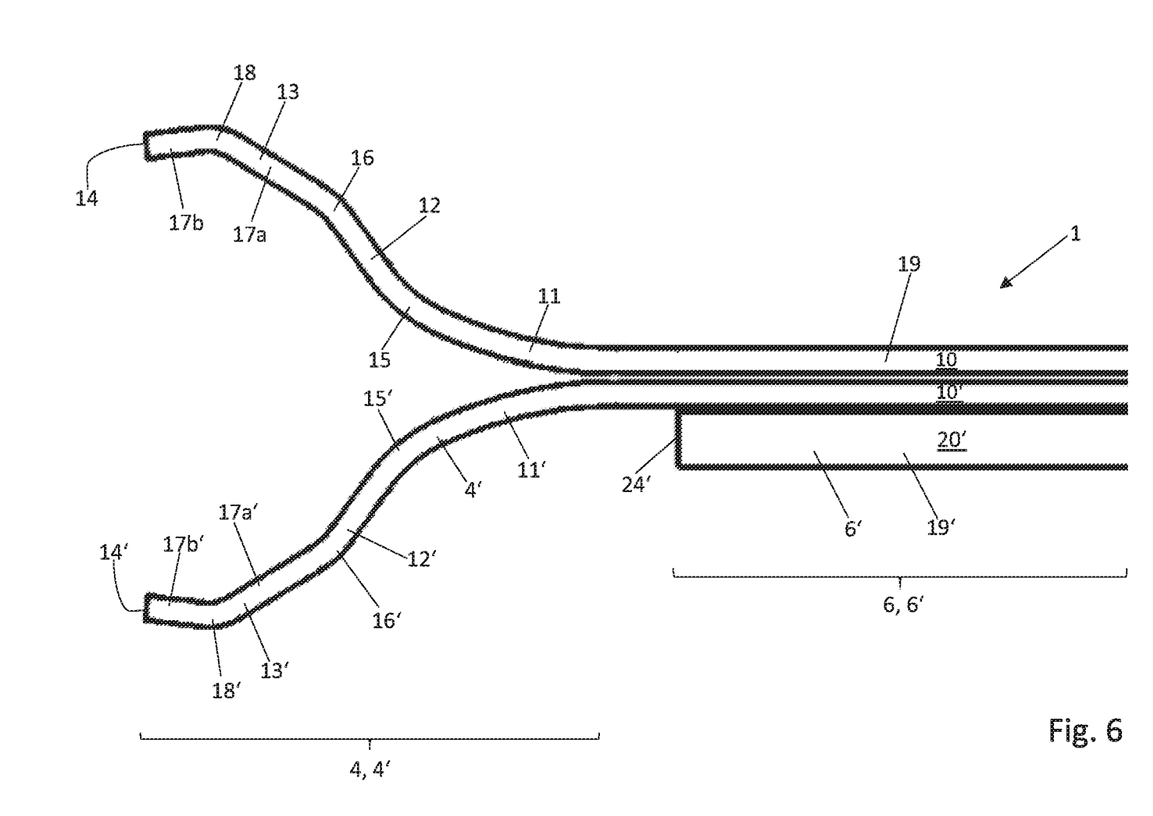

FIG. 6 shows another embodiment of a flat gasket according to the present disclosure, which is designed similarly to that of FIG. 5. In contrast to the flat gasket of FIG. 5, the upper compression protective layer 20 is now no longer present. The remaining aspects of the flat gasket from FIG. 6 generally corresponds to that of FIG. 5 in aspects. The compression protective layer 20' is now provided as the first compression protective layer. The first sealing layer 10' and the first compression protective layer 20' are likewise designed according to the present disclosure, wherein, in turn, sealing between two mating components, which are arranged above the sealing layer 10 and beneath the compression protective layer 20', is improved by the additional sealing layer 10.

Figure 7:
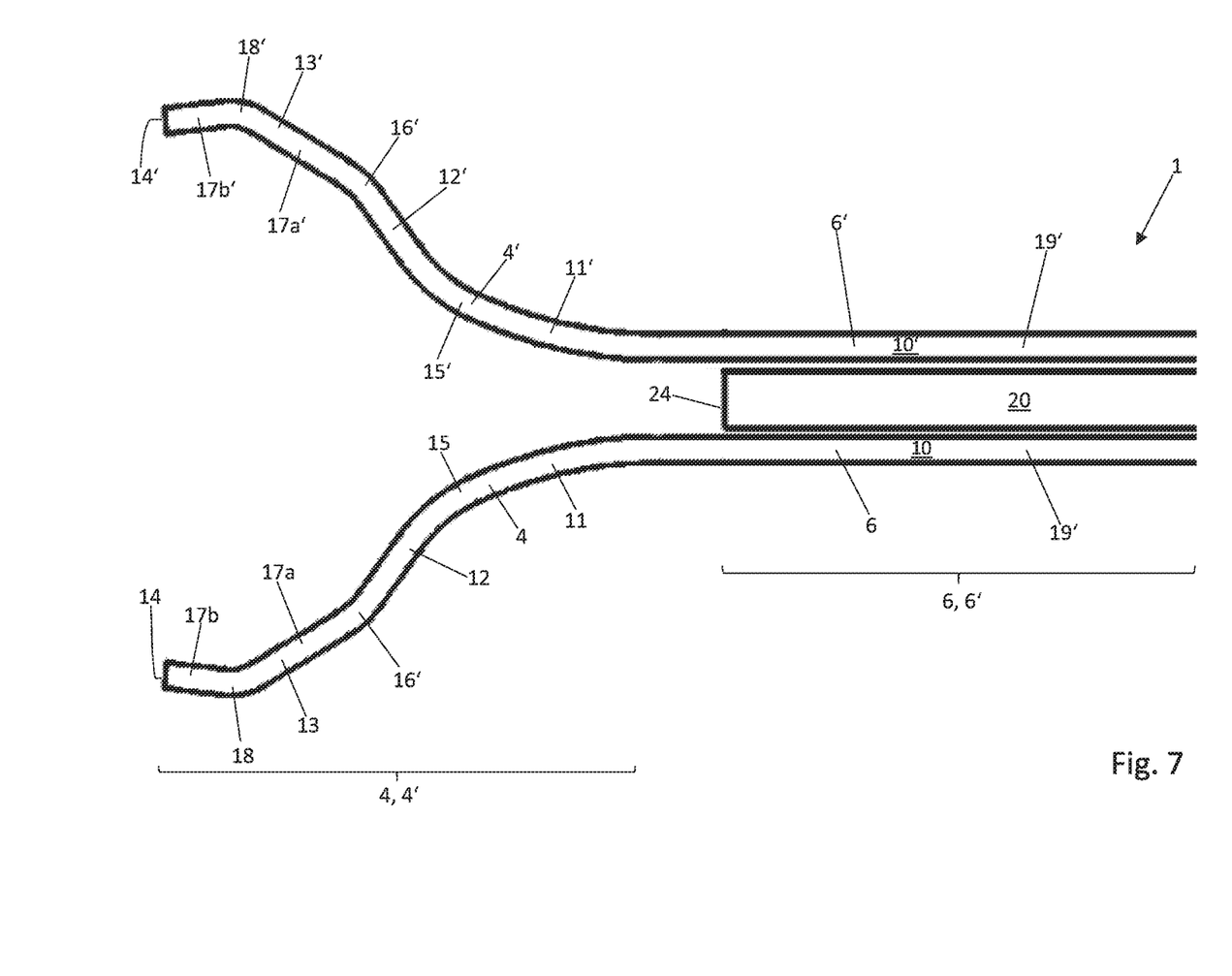

FIG. 7 shows another embodiment of the flat gasket according to the present disclosure, comprising a first sealing layer 10 and a first compression protective layer 20. In contrast to the preceding exemplary embodiments, the first sealing layer 10 is now designed so as to be deformed in the sealing section 4 thereof, proceeding from the first compression protective layer 20, directed radially inwardly to the media flow opening 2 in such a way that it points away from the plane of the first compression protective layer 20. The first sealing layer 10 is designed similarly to the embodiment of FIGS. 3A and 3B in other aspects. In addition, a second sealing layer 10' is arranged in the flat gasket 1 of FIG. 7, which is designed completely mirror-symmetrically to the first sealing layer 10 with respect to a mirror plane that corresponds to the center plane of the first compression protective layer 20 in the cross-section.

Such a design of the flat gasket according to the present disclosure also provides excellent sealing by way of the inner sections 13, 13' between two mating components, between which the flat gasket 1 is clamped.

Figure 8:
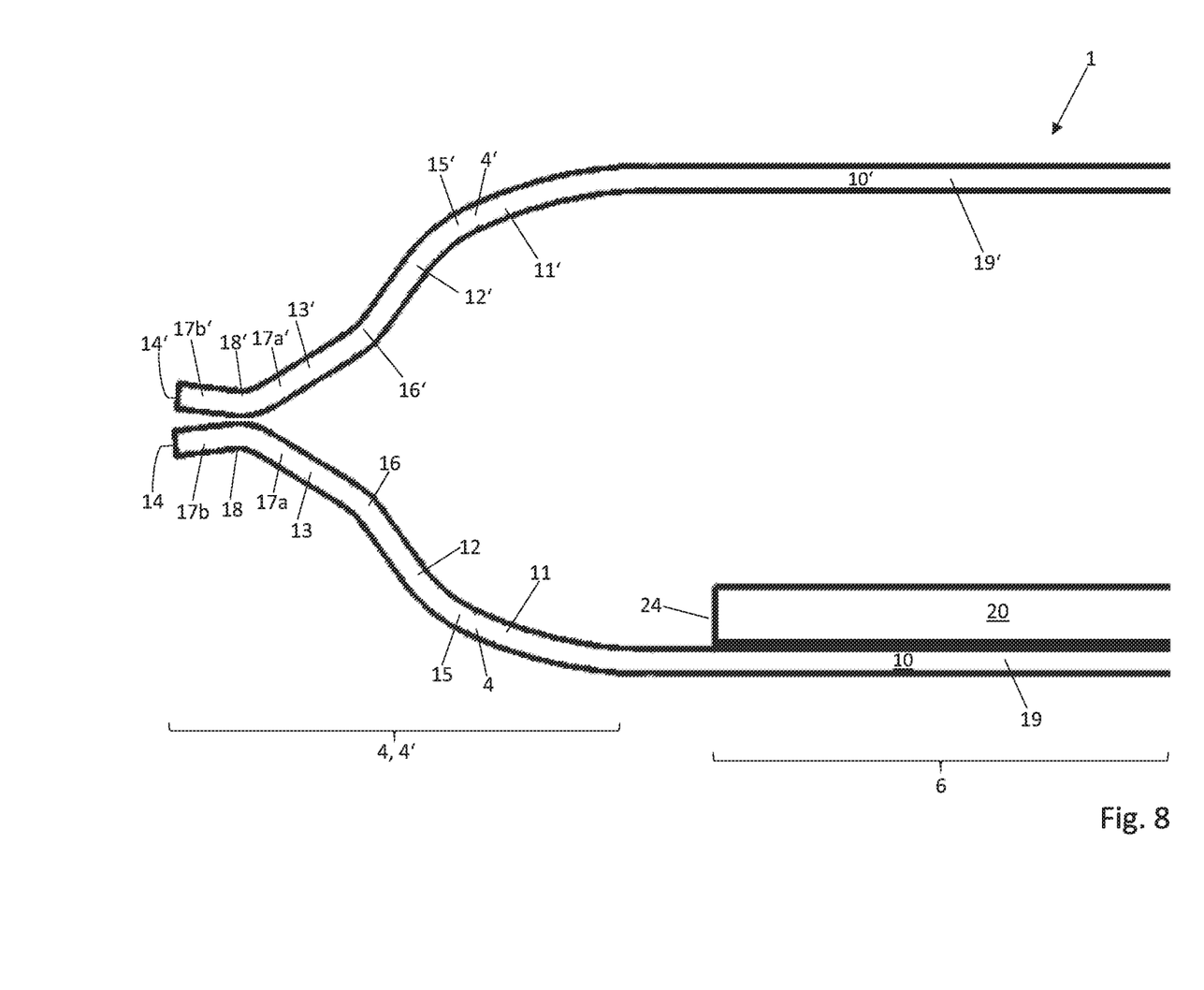

FIG. 8 shows another flat gasket 1 comprising a first sealing layer 10 and a compression protective layer 20, which are designed similarly as those in FIGS. 3A and B. In addition, another second sealing layer 10' is provided, which is likewise designed identically to the first sealing layer 10. However, in contrast to the first sealing layer 10, this is designed completely mirror-symmetrically with respect to a plane on which the two sealing layers make contact with one another, in the non-mounted, non-compressed state, in the arrangement of the first sealing layer 10 and the second sealing layer 10'. This is the case in FIG. 8 in the region of the bending points 18, 18'.

The mirror plane extends parallel to the center plane of the first compression protective layer 20.

Figure 9:
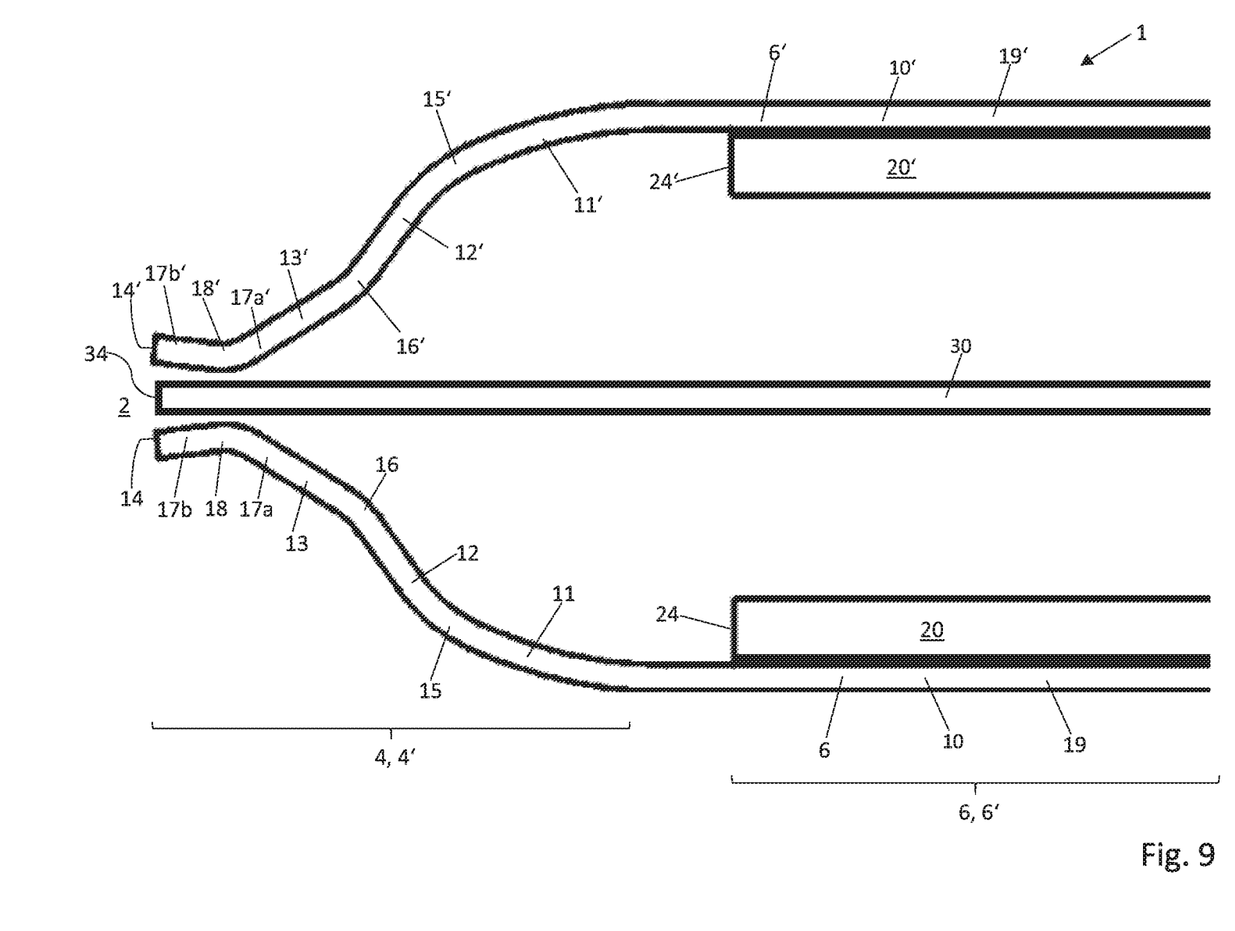

FIG. 9 shows another flat gasket 1 according to the present disclosure, which is designed as that of FIGS. 3A and 3B with respect to the first sealing layer 10 and the first compression protective layer 20. Additionally, the flat gasket 1 in FIG. 9 comprises a second sealing layer 10', as in FIG. 8. A compression protective layer is arranged next to this second sealing layer 10', serving as a second compression protective layer 20'.

The second sealing layer 10' and the second compression protective layer 20' are designed and arranged completely mirror-symmetrically with respect to the first sealing layer 10 and the first compression protective layer 20. The same plane as in FIG. 8 serves as the mirror plane; however, a spacer layer 30 is additionally formed in this mirror plane. The spacer layer 30 extends in a plane between the compression protective layers 20, 20' and the sealing layers 10, 10' up to the edge 34 forming the circumferential edge around the media flow opening 2 of the spacer layer 30. The edge 34 is designed to be substantially aligned with the edges 14, 14'.

Figure 10:
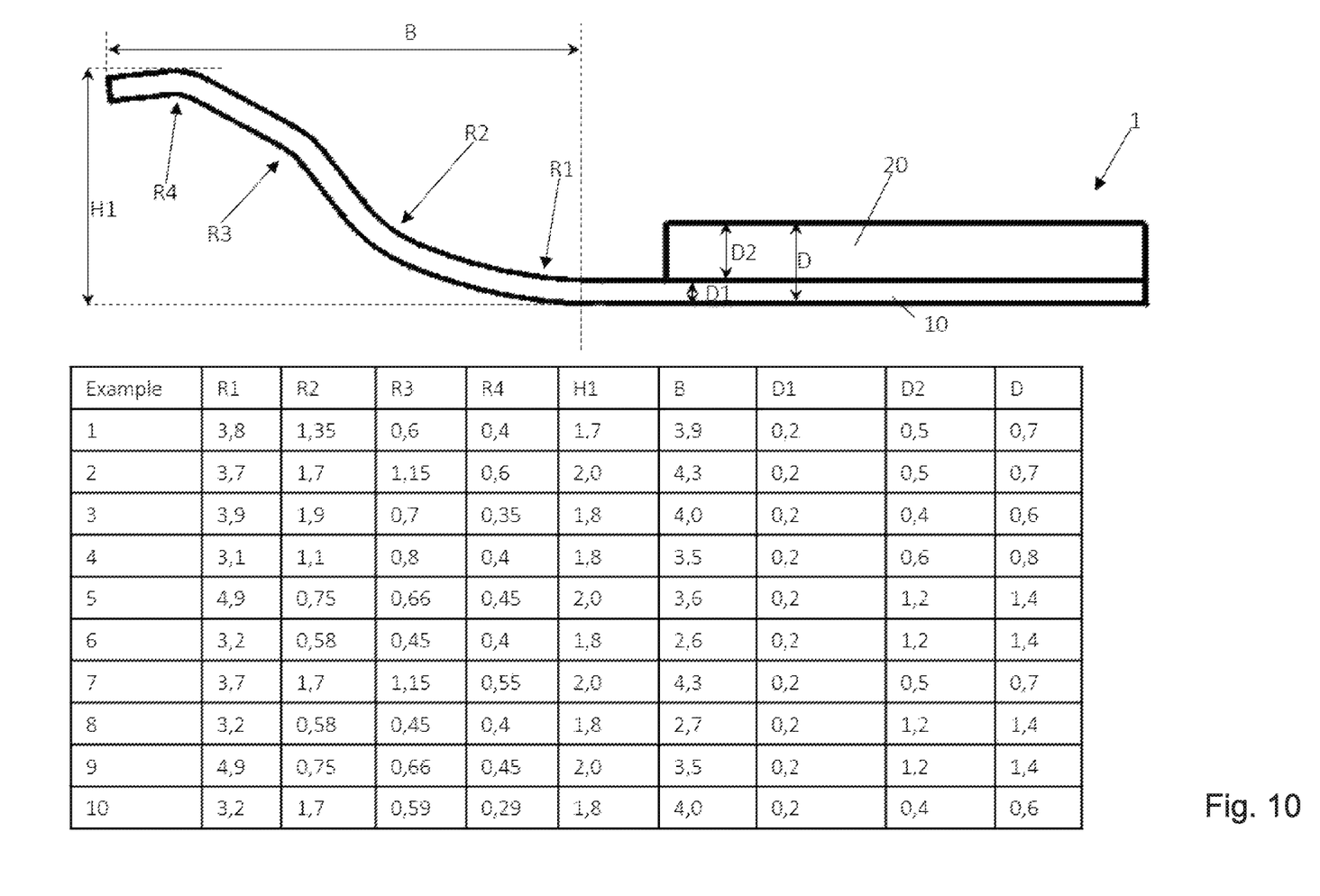
FIG. 10 shows a table containing values of flat gaskets according to the present disclosure.

FIG. 10 shows values for a flat gasket 1, as it is illustrated in FIGS. 3A and 3B and shown again with respect to the dimensions in FIG. 10 in the upper partial figure.

The lower partial figure of FIG. 10 shows the respective dimensions for ten specific examples of such flat gaskets. These agree with the values for the radii R1, R2, R3, R4, for the height H1, the width B, the sheet metal thicknesses D1 and D2, and the installed thickness D.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. For example, the above technology can be applied to many types of gaskets such as in an exhaust, turbocharger or in non-automotive uses. The subject matter of the present disclosure includes all novel and non-obvious combinations and sub-combinations of the various systems and configurations, and other features, functions, and/or properties disclosed herein.

As used herein, the terms "approximately" and "substantially" are construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A flat gasket, comprising:
   at least one metallic first sealing layer and at least one metallic first compression protective layer arranged adjoining one another in a direction perpendicular to a plane of the first sealing layer and/or of the first compression protective layer,
   the first sealing layer and the first compression protective layer each comprising at least one overlapping section in which the first sealing layer and the first compression protective layer overlap one another, the at least one overlapping section arranged along a circumferential edge of the flat gasket and a distance away from the circumferential edge of the flat gasket, and
   the first sealing layer having a protrusion extending away from and beyond the first compression protective layer,
   a sealing section arranged in the protrusion, the sealing section having a cross-section pointing from the overlapping section to the circumferential edge:
   a) the sealing section is deformed in a direction of a plane of the compression protective layer, or pointing away from the plane of the compression protective layer;
   b) the sealing section comprises a first section, a second section and a third section, the first section extending from a flat portion of the first sealing layer to the second section, the first section is partially, substantially or completely curved with a radius R1, and the second section and the third section each comprise a non-curved, straight section;
   c) a transition point having a radius R2 separating the first section curved and the straight section of the second section;
   d) a transition point having a radius R3 separating the straight section of the second section and the straight section of the third section R3; and
   e) R1>R2 and R1>R3.

2. The flat gasket according to claim 1, wherein the circumferential edge is an outer edge of the flat gasket extending circumferentially around the flat gasket, or a circumferential rim edge of a through-opening inside the flat gasket.

3. A flat gasket, comprising at least one first metallic sealing layer and a first metallic compression protective layer,
   the first sealing layer and the first compression protective layer each including at least one media flow opening,
   the at least one media flow opening of the first sealing layer and of the first compression protective layer being arranged adjoining one another and together forming a media flow opening of the flat gasket surrounded by a circumferential edge,
   the first sealing layer and the first compression protective layer being arranged adjoining one another and overlapping one another in an overlapping section, the overlapping section arranged along the circumferential edge of the respective media flow opening thereof, and
   the first sealing layer having a protrusion extending away from and beyond the first compression protective layer, the protrusion arranged along the circumferential edge of the media flow opening of the first sealing layer and in a direction extending radially away from the overlapping section and toward the media flow opening, the protrusion forming a sealing section extending completely circumferentially around the media flow opening of the first sealing layer,
   wherein the sealing section has a cross-section, the sealing section:
   a) is deformed in a direction of the plane of the compression protective layer, or pointing away from the plane of the compression protective layer and, the sealing section comprises an outer section, a central section, and an inner section;
   b) the outer section extending from a flat portion of the first sealing layer to the central section, the outer section partially, substantially or completely curved with a radius R1, and the central section and the inner section each partially or completely comprise a non-curved, straight section;
   c) a transition point having a radius R2 separating the outer section and the straight section of the central section;
   d) a transition point having a radius R3 separating the straight section of the central section and the straight section of the inner section; and
   e) R1>R2 and R1>R3.

4. The flat gasket according to claim 3, wherein the media flow openings of one, more or all layers of the flat gasket are arranged coaxially or with center axes extending parallel to one another.

5. The flat gasket according to claim 1, wherein the flat portion of the first sealing layer extends continuously and uniformly between the overlapping section and the first section of the sealing section.

6. The flat gasket according to claim 1, wherein the first sealing layer has a layer thickness D1, determined in straight regions extending parallel to the first compression protective layer, wherein R1>8 D1.

7. The flat gasket according to claim 6, wherein the first sealing layer in the sealing section spans a height H1 between the plane of the first sealing layer and a maximum height of the third section, wherein H1>6 D1.

8. The flat gasket according to claim 6, wherein the sealing section of the first sealing layer, in the cross-section in a direction pointing from the overlapping section to the circumferential edge, has a width B, wherein B≥10 D1.

9. The flat gasket according to claim 1, wherein at least one of the following applies: R1≥2 R3, R2≥R3, and R1≥2 R2.

10. The flat gasket according to claim 1, wherein in a cross section extending from the overlapping section to the circumferential edge, in a direction pointing towards the circumferential edge, the curvature with the radius R3 is oriented in an opposite direction than the curvature with the radius R1 and/or to the opposite direction of the curvature with the radius R2.

11. The flat gasket according to claim 1, wherein in a cross section extending from the overlapping section to the circumferential edge, in a direction pointing towards the circumferential edge, the curvatures with the radii R1 and R2 are oriented in a same direction.

12. The flat gasket according to claim 1, wherein in the cross-section in a direction pointing from the overlapping section to the circumferential edge, the third section consecutively comprises two straight sub-sections, which are connected to one another by way of a bending point having a radius R4, wherein 0.5≤R3/R4≤2.

13. The flat gasket according to claim 1, wherein in a cross section extending from the overlapping section to the circumferential edge, in a direction pointing towards the circumferential edge, the curvatures with radii R3 and R4 are oriented in the direction of the surface of the sealing layer opposite to the compression protection layer.

14. The flat gasket according to claim 1, wherein the first sealing layer has a thickness D1, determined in straight regions extending parallel to the first compression protective layer, and the first compression protective layer has a thickness D2, determined in regions of the first compression protective layer parallel thereto, wherein D1+D2≥2.5 D1.

15. The flat gasket according to claim 1, wherein the sealing section of the first sealing layer, in the installed state, forms one or more sealing lines extending along the inner circumferential edge of the media flow opening of the first sealing layer and/or of the sealing section, the sealing lines arranged on different sides of the plane of the first compression protective layer, and the sealing section engages in or passes through the plane or the media flow opening of the first compression protective layer.

16. The flat gasket according to claim 15, wherein at least one of the sealing lines is arranged so as to extend completely circumferentially around the circumferential edge of the media flow opening.

17. The flat gasket according to claim 1, wherein when the flat gasket is installed, the third section rests against a first adjoining component and the first section rests against a second adjoining component.

18. A sealing layer for sealing with respect to two adjoining surfaces of two components, comprising:
at least one overlapping section in which the sealing layer and a compression protective layer overlap, the overlap arranged along a circumferential edge of the sealing layer and at least in sections at a distance from the circumferential edge of the sealing layer; and
a sealing section oriented extending away from the overlapping section and towards the circumferential edge,
wherein the sealing section comprises a cross-section pointing from the overlapping section to the circumferential edge,
a) the sealing section is deformed out of a plane of the sealing layer in the overlapping section and the sealing section comprises a first section, a second section, and a third section;
b) the first section extending from a flat portion of the first sealing layer to the second section, the first section is partially, substantially or completely curved with a radius R1, and the second section and the third section each partially or completely comprise a non-curved, straight section;
c) the first section curved and the straight section of the second section transition into one another by way of a transition point having a radius R2;
d) the straight section of the second section and the straight section of the third section transition into one another by way of a bending point having a radius R3; and
e) R1≥R2 and R1>R3.

19. The flat gasket of claim 3, wherein the flat portion of the first sealing layer extends continuously and uniformly between the overlapping section and the outer section of the sealing section.

20. The sealing layer of claim 18, wherein the flat portion of the first sealing layer extends continuously and uniformly in the plane of the first sealing layer between the overlapping section and the first section of the sealing section.

* * * * *